(12) United States Patent
Brunn et al.

(10) Patent No.: US 11,222,085 B2
(45) Date of Patent: Jan. 11, 2022

(54) FINDING CONTENT ON COMPUTER NETWORKS

(71) Applicant: International Business Machines Corporation, Armonk, NY (US)

(72) Inventors: Jonathan F. Brunn, Logan, UT (US); Marit L. Imsdahl, Morrisville, NC (US); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 538 days.

(21) Appl. No.: 15/364,118

(22) Filed: Nov. 29, 2016

(65) Prior Publication Data

US 2018/0150558 A1 May 31, 2018

(51) Int. Cl.
*G06F 16/9535* (2019.01)
*G06F 16/9537* (2019.01)
*G06F 16/951* (2019.01)
*G06F 16/955* (2019.01)

(52) U.S. Cl.
CPC ........ *G06F 16/9535* (2019.01); *G06F 16/951* (2019.01); *G06F 16/955* (2019.01); *G06F 16/9537* (2019.01); *G06F 16/9566* (2019.01)

(58) Field of Classification Search
CPC .................................................. G06F 16/951
See application file for complete search history.

(56) References Cited

U.S. PATENT DOCUMENTS

| | | | |
|---|---|---|---|
| 7,672,928 | B2 | 3/2010 | Maloney et al. |
| 7,693,956 | B2 * | 4/2010 | Moricz ............ G06Q 30/0277 709/217 |
| 7,899,807 | B2 | 3/2011 | Olston et al. |
| 8,041,710 | B2 | 10/2011 | He et al. |
| 8,255,541 | B2 * | 8/2012 | Reisman ................ G06F 16/00 709/227 |

(Continued)

FOREIGN PATENT DOCUMENTS

WO 2015120125 A1 8/2015

OTHER PUBLICATIONS

Bergman, Michael K. "White paper: the deep web: surfacing hidden value." Journal of electronic publishing 7.1 (2001). (Year: 2001).*

(Continued)

*Primary Examiner* — Brittany N Allen

(74) *Attorney, Agent, or Firm* — Konrad, Raynes, Davda and Victor LLP; Janaki K. Davda

(57) ABSTRACT

Provided are techniques for finding content on computer networks. A search request having search terms is received. The search request is executed against an index to identify first search results, wherein the index comprises mappings of search terms to web sites and mappings of search terms to patterns. In response to determining that the search request failed based on first search results, an unknown search term in the search terms that does not exist in the index is found. The unknown search term is matched to a pattern of a similar search term using the mappings of search terms to patterns. A candidate web site is identified based on the matching. Additional content is requested from the candidate web site for the unknown search term to identify second search results comprising previously hidden content. The additional content is indexed.

10 Claims, 7 Drawing Sheets

(56) References Cited

U.S. PATENT DOCUMENTS

| | | | | |
|---|---|---|---|---|
| 8,639,680 | B1* | 1/2014 | Ciccolo | G06F 16/24578 707/706 |
| 8,862,579 | B2* | 10/2014 | Wissner | G06F 17/241 707/731 |
| 8,868,540 | B2* | 10/2014 | Ture | G06F 21/6227 707/709 |
| 8,898,137 | B1* | 11/2014 | Brundage | G06F 16/9566 707/708 |
| 2006/0200490 | A1 | 9/2006 | Abbiss | |
| 2008/0097958 | A1* | 4/2008 | Ntoulas | G06F 16/951 |
| 2009/0204610 | A1* | 8/2009 | Hellstrom | G06F 16/00 |
| 2009/0248686 | A1 | 10/2009 | Ponnappan et al. | |
| 2009/0299991 | A1* | 12/2009 | Zarzar Charur | G06F 16/3322 |
| 2010/0268720 | A1* | 10/2010 | Spivack | G06F 16/9537 707/756 |
| 2011/0087646 | A1* | 4/2011 | Dalvi | G06F 16/951 707/709 |
| 2012/0143844 | A1 | 6/2012 | Wang et al. | |
| 2013/0031086 | A1* | 1/2013 | Strelec | G06F 16/2465 707/722 |
| 2013/0123890 | A1* | 5/2013 | Latham | A61F 7/10 607/109 |
| 2014/0207748 | A1* | 7/2014 | Sood | G06F 16/9537 707/706 |
| 2018/0357326 | A1* | 12/2018 | Lepeska | G06F 16/9574 |

OTHER PUBLICATIONS

Qiu, J., Shao, F., Zatsman, M., & Shanmugasundaram, J. (2003). Index Structures for Querying the Deep Web. WebDB. (Year: 2003).*

Luciano Barbosa and Juliana Freire. 2007. An adaptive crawler for locating hidden-Web entry points. In Proceedings of the 16th international conference on World Wide Web (WWW '07). Association for Computing Machinery, New York, NY, USA, 441-450. (Year: 2007).*

Jayant Madhavan, David Ko, Łucja Kot, Vignesh Ganapathy, Alex Rasmussen, and Alon Halevy. 2008. Google's Deep Web crawl. Proc. VLDB Endow. 1,2 (Aug. 2008), 1241-1252. (Year: 2008).*

Fan Wang and Gagan Agrawal. 2009. SEEDEEP: A System for Exploring and Querying Scientific Deep Web Data Sources. In Proceedings of the 21st International Conference on Scientific and Statistical Database Management (SSDBM 2009). Springer-Verlag, Berlin, Heidelberg, 74-82. (Year: 2009).*

Yeye He, Dong Xin, Venkatesh Ganti, Sriram Rajaraman, and Nirav Shah. 2013. Crawling deep web entity pages. In Proceedings of the sixth ACM international conference on Web search and data mining (WSDM '13). Association for Computing Machinery, New York, NY, USA, 355-364. (Year: 2013).*

Mell et al., "Effectively and Securely Using the Cloud Computing Paradigm", dated Oct. 7, 2009, NIST, Information Technology Laboratory, Total 80 pages.

Mell et al., "The NIST Definition of Cloud Computing", dated Sep. 2011, Recommendations of the National Institute of Standards and Technology, Total 7 pages.

List of IBM Patents or Patent Applications Treated as Related, dated Dec. 22, 2017, pp. 2.

US Patent Application, dated Dec. 22, 2017, for U.S. Appl. No. 15/853,410 (54.140C1), filed Dec. 22, 2017, invented by Jonathan F. Brunn et al., Total 34 pages.

Preliminary Amendment, dated Dec. 22, 2017, for U.S. Appl. No. 15/853,410 (54.140C1), filed Dec. 22, 2017, invented by Jonathan F. Brunn et al., Total 5 pages.

Final Office Action, dated Aug. 27, 2020 for U.S. Appl. No. 15/853,410 (54.140C1), filed Dec. 22, 2017, invented by Jonathan F. Brunn et al., Total 20 pages.

Response to Final Office Action, dated Nov. 9, 2020, for U.S. Appl. No. 15/853,410 (54.140C1), filed Dec. 22, 2017, invented by Jonathan F. Brunn et al., Total 11 pages.

Office Action, dated Jun. 8, 2020 for U.S. Appl. No. 15/853,410 (54.140C1), filed Dec. 22, 2017, invented by Jonathan F. Brunn at al., Total 25 pages.

Response to Office Action, dated Jun. 30, 2020, for U.S. Appl. No. 15/853,410 (54.140C1), filed Dec. 22, 2017, invented by Jonathan F. Brunn et al., Total 9 pages.

Office Action, dated May 24, 2021 for U.S. Appl. No. 15/853,410 (54.140C1), filed Dec. 22, 2017, invented by Jonathan F. Brunn at al., Total 21 pages.

Response to Office Action, dated Aug. 18, 2021, for U.S. Appl. No. 15/853,410 (54.140C1), filed Dec. 22, 2017, invented by Jonathan F. Brunn et al., Total 11 pages.

Notice of Allowance, dated Oct. 27, 2021, for U.S. Appl. No. 15/853,410, filed Dec. 22, 2017, Total 18 pages.

* cited by examiner

FINDING CONTENT ON COMPUTER NETWORKS

FIELD

Embodiments of the invention relate to finding content on computer networks. With embodiments, the content cannot be found by following known web links, so the content may be described as "hidden" or "uncrawlable".

BACKGROUND

Oftentimes, a search engine "crawls" (searches) for content (e.g., web sites) on a computer network, such as the Internet, and indexes the content for use in responding to search requests (queries). A sitemap may be described as a list of pages of a web site accessible to the search engine.

However, some content may only be found behind proprietary search boxes on individual websites and such content is not provided in the sitemap. In some cases, such content may be found by crawling links across websites (i.e., by going to a second website that links to the first website's uncrawlable content and following the link to access the uncrawlable content. Yet, there is some content that is still not crawled, since it has never been linked to from any web site, or at least any publicly crawlable web site.

For instance, content on a company's support portals is not always well indexed. New content (e.g., technotes, ifix documents, etc.) may take a while to be indexed in search engines. Some pages are dynamically generated. In this case, any number of pages may be generated based on a large number of queries, which are not enumerated ahead of time in any sitemap. It is in the web site's interest to be well indexed (so that they are located for search requests and displayed to a user), so web sites have a motivation to provide complete sitemaps of content that may be hidden behind search fields. Still, some web sites do not do this. It is also in the interest of the search engine to have a complete index, despite web sites not providing a complete sitemap.

SUMMARY

Provided is a method for finding content on computer networks. The method comprises: receiving, with a processor of a computer, a search request having search terms; executing the search request against an index to identify first search results, wherein the index comprises mappings of search terms to web sites and mappings of search terms to patterns; and, in response to determining that the search request failed based on first search results, identifying an unknown search term in the search terms that does not exist in the index, matching the unknown search term to a pattern of a similar search term using the mappings of search terms to patterns, identifying a candidate web site based on the matching, requesting additional content from the candidate web site for the unknown search term to identify second search results comprising previously hidden content, and indexing the additional content results.

Provided is a computer program product for finding content on computer networks. The computer program product comprises a computer readable storage medium having program code embodied therewith, the program code executable by at least one processor to perform: receiving, with a processor of a computer, a search request having search terms; executing the first request against an index to identify first search results, wherein the index comprises mappings of search terms to web sites and mappings of search terms to patterns; and, in response to determining that the search request failed based on first search results, identifying an unknown search term in the search terms that does not exist in the index, matching the unknown search term to a pattern of a similar search term using the mappings of search terms to patterns, identifying a candidate web site based on the matching, requesting additional content from the candidate web site for the unknown search term to identify second search results comprising previously hidden content, and indexing the additional content results.

Provided is a computer system for finding content on computer networks. The computer system comprises one or more processors, one or more computer-readable memories and one or more computer-readable, tangible storage devices and program instructions, stored on at least one of the one or more computer-readable, tangible storage devices for execution by at least one of the one or more processors via at least one of the one or more memories, to perform operations comprising: receiving, with a processor of a computer, a search request having search terms; executing the search request against an index to identify first search results, wherein the index comprises mappings of search terms to web sites and mappings of search terms to patterns; and, in response to determining that the search request failed based on first search results, identifying an unknown search term in the search terms that does not exist in the index, matching the unknown search term to a pattern of a similar search term using the mappings of search terms to patterns, identifying a candidate web site based on the matching, requesting additional content from the candidate web site for the unknown search term to identify second search results comprising previously hidden content, and indexing the additional content results.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments, as part of a search engine, detect when a user has not found the content intended, and then take actions to find content that was missed and not normally indexable or crawlable (discoverable) through standard crawling by the search engine. Embodiments improve search results by using a user's failed searches to proactively seek out new (additional) content to index. With embodiments, the content is not found by following known web links, so the content may be described as "hidden" or "uncrawlable".

Figure 1:
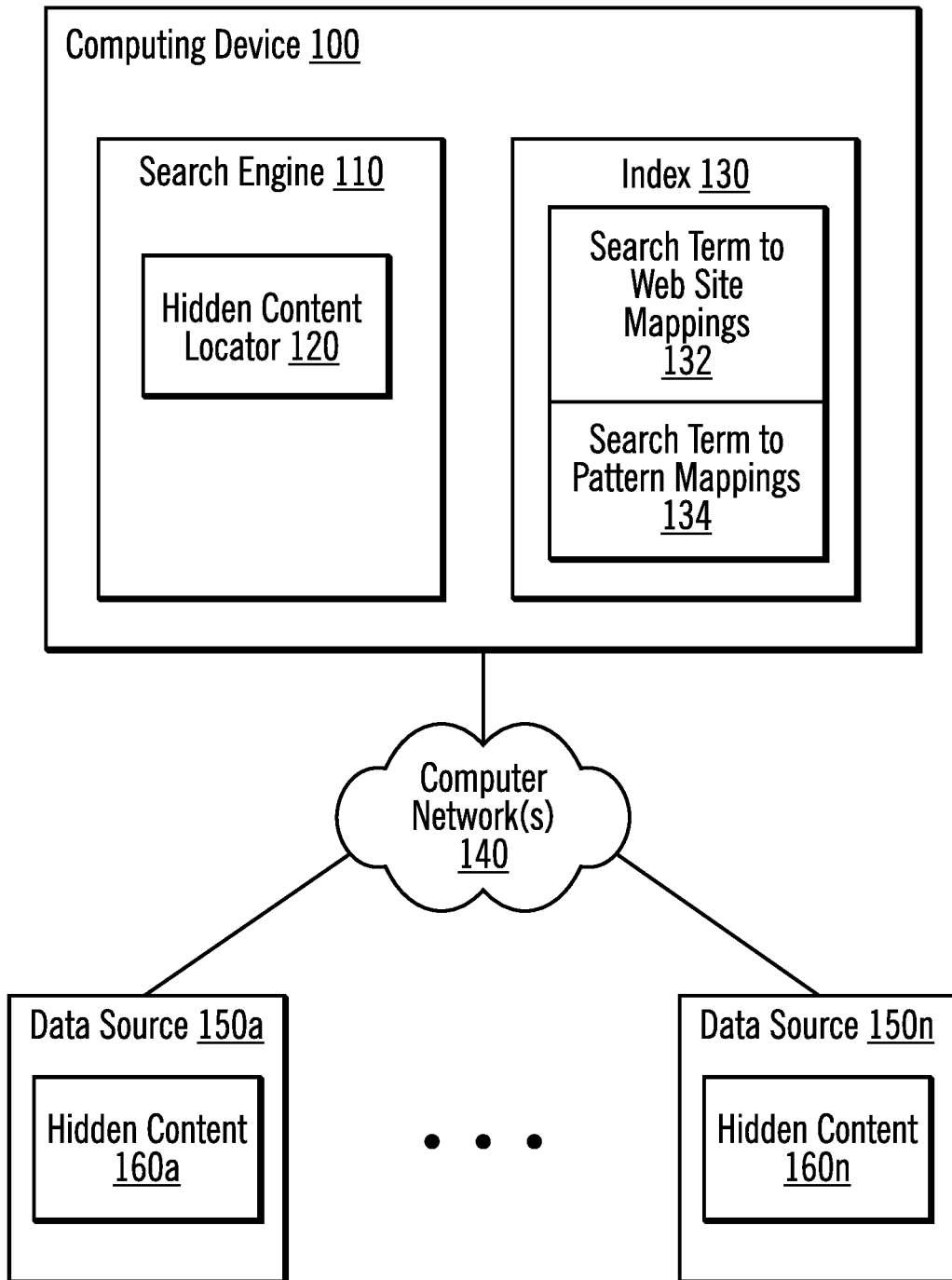
FIG. 1 illustrates, in a block diagram, a computing environment in accordance with certain embodiments.

FIG. 1 illustrates, in a block diagram, a computing environment in accordance with certain embodiments. In FIG. 1, a computing device 100 is coupled, via one or more networks 140, to data sources 150a . . . 150n. The use of "a", "n", and ellipses indicates that there may be any number of data sources. The computing device 100 includes a search engine 110 and an index 130. The search engine 110 includes a hidden content locator 120 for finding hidden content. The search engine 110 is capable of crawling or includes a crawling engine for crawling the data sources 150a . . . 150n to identify web sites and build the index 130. The index 130 includes search term to web site mappings 132 and search term to pattern mappings 134. In certain embodiments, the hidden content locator 120 stores search term to pattern mappings 134 in the index 130 for search terms that are unknown words (e.g., not found in a dictionary or a string of random characters).

At least some of the data sources 150a . . . 150n include hidden content 160a . . . 160n (i.e., content that is not easily crawlable). With embodiments, some of the data sources (that are coupled to the computing device 100) do not contain hidden content. With embodiments, the computer networks 140 include intranets, the Internet, local area networks, etc.

Figure 2A:
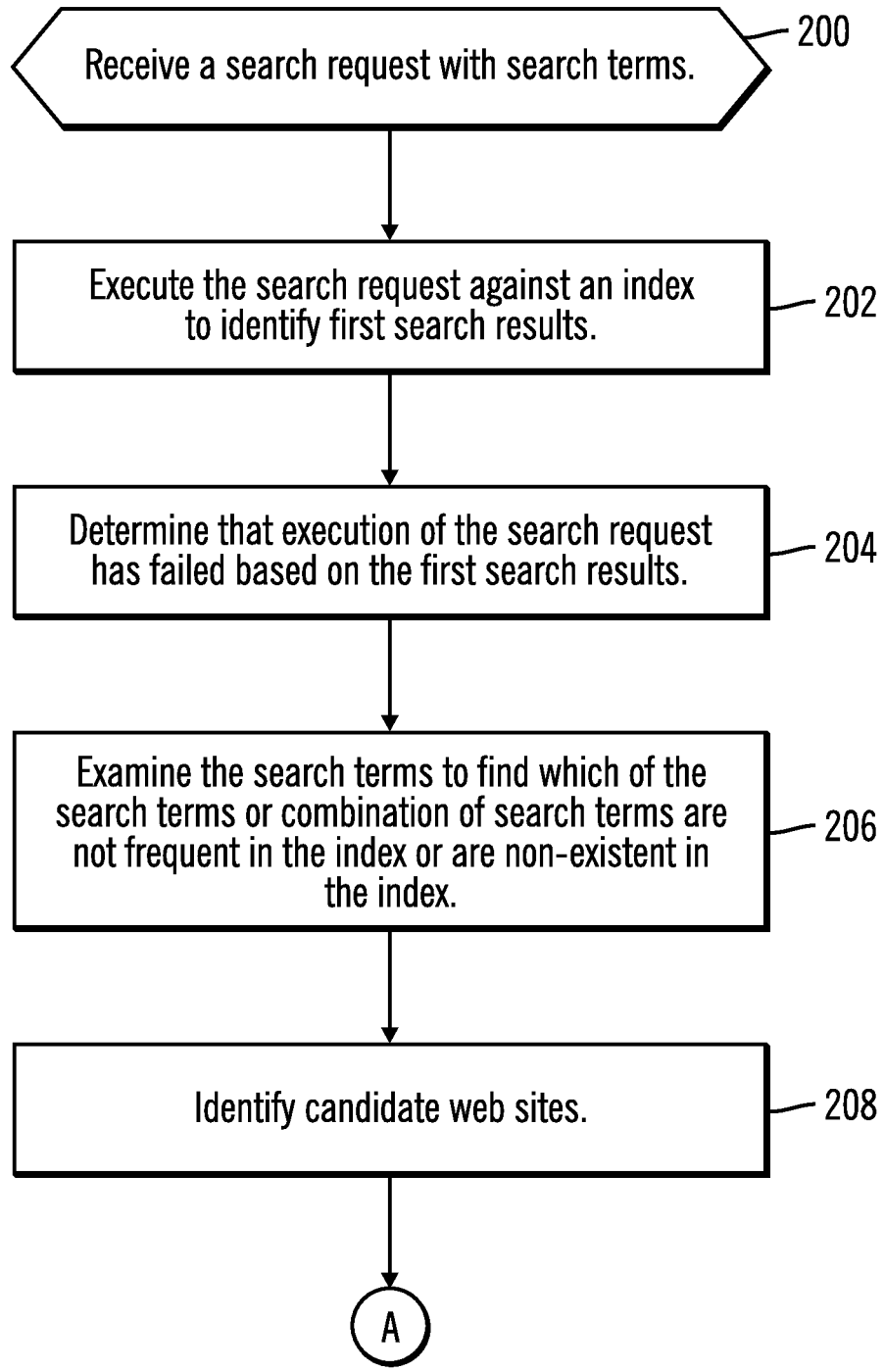
FIGS. 2A and 2B illustrate, in a flow chart, operations for finding hidden content in accordance with certain embodiments.
Figure 2B:
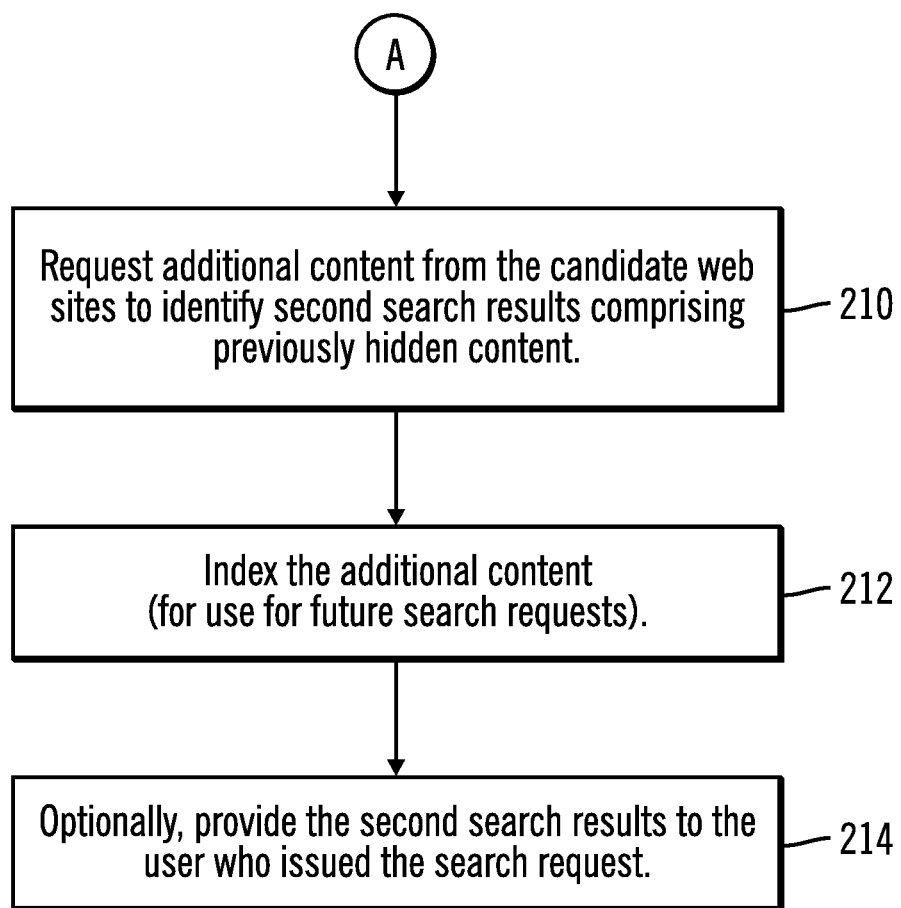

FIGS. 2A and 2B illustrate, in a flow chart, operations for finding hidden content in accordance with certain embodiments. Control begins at block 200 with the hidden content locator 120 of the search engine 110 receiving a search request with search terms. The search terms may also be referred to as keywords. This search request may be a first search request. In block 202, the hidden content locator 120 executes the search request against an index to identify (obtain) first search results. In certain embodiments, the processing of block 202 includes providing the first ("initial") search results to the user who issued the search request.

In block 204, the hidden content locator 120 determines that execution of the search request has failed based on the first search results. With embodiments, the hidden content locator 120 determines that the search failed by one or more of:
  a) finding no results;
  b) finding and displaying results such that the most relevant one or more results have a low relevancy score; and
  c) finding and displaying results and noticing that the user abandoned the search results (especially in combination with the most relevant one or more results having a low relevancy score).

With embodiments, the hidden content locator 120 determines that the user has abandoned by search based on, for example, the user issuing another search rather than selecting one of the displayed results.

In block 206, the hidden content locator 120 examines the search terms to find which of the search terms or combination of search terms are not frequent in the index or are non-existent in the index. With embodiments, non-existent search terms may be words (e.g., not found in a dictionary or a string of seemingly random characters). Even if the combination of search terms is not found (e.g., 3 search terms), a combination of a subset of the search terms may be found (e.g., 2 of the 3 search terms).

In block 208, the hidden content locator 120 identifies candidate web sites. With embodiments, the hidden content locator 120 identifies the candidate web sites with one or more of the following:
  a) In the case of the one or more search terms being non-existent in the index (i.e., not being known words, such as a string of seemingly random characters), the hidden content locator 120 compares each of the one or more search terms that are non-existent in the index with previous patterns of known search terms ("words") unique to certain web sites. For instance, if the search terms AX7532 and TX3852 were previously found in web site A, then the hidden content locator 120 maps patterns of \a[X]\d\d\d and \a\a\d\d\d\d to the web site in the index 130. Thus, embodiments associate a set of patterns with web sites during the normal crawling process (out of band of user's search request). A predictive score is associated with the combination of pattern and web site to indicate how strongly that pattern is associated with the web site. In certain embodiments, the predictive score is the count of times words matched the pattern. In other embodiments, the predictive score is that count divided by another value indicating the total number of search terms or pages indexed. With embodiments, search terms are compared against known patterns to find candidate web sites, and the candidate web sites are ranked according to their predictive scores with respect to the matching pattern. With embodiments, the patterns associated with a site are derived from the known Uniform Resource Locators (URLs) of that site, the prior search terms used which resulted in a successful click-through or navigation to that site, and the content of the known pages on that site. Each of these sources may be weighted differently in the predictive model. For instance, search terms may be given greater weight to prevent a site from loading its content with content designed to skew patents. The predictive model may be personalized, with different models or weights applied to different individuals. The search terms and patterns derived may be weighed so as to prevent a single individual from disproportionately skewing the model. The hidden content locator 120 may count each pattern and site association only once per user despite how many times it is used by that user, or the count of associations may be weighted to value unique users over the same user using the pattern multiple times. For instance, in certain embodiments, the hidden content locator 120 may apply a logarithmic function to the count from each individual, site, and pattern association before summing across individuals when considering search terms.
  b) The hidden content locator 120 identifies as candidate web sites: 1) web sites frequently searched by the user who issued the search request, 2) web sites frequently in the results for that user, and 3) web sites with a high click-through rate in result lists for that user. For instance, a user may commonly search for technotes, and so the web site for technotes is identified as a candidate web site.
  c) The hidden content locator 120 identifies whether the user is connecting from a known corporate network or known geography, and identifies the corresponding corporate web site or known national, regional or local government body web sites as candidate web sites.

d) The hidden content locator 120 identifies as candidate web sites: a set of web sites with an incomplete sitemap (i.e., web sites for which content is known to exist (through crawling of links originating outside the web site) but where the sitemap or internal links for the web site do not reveal all known content of that web site).

e) The hidden content locator 120 identifies as candidate web sites: web sites which, through parsing of HyperText Markup Language (HTML) or other responses, are known to provide their own search box, especially those which are not supported by ("powered by") a public search index (for instance, where the web site's own search is not supported by the public search index). Format of the form and fields and target of the form may be used to exclude search boxes that are already using a public search engine (and which would therefore only reveal content already indexed by the search engine). With embodiments, the hidden content locator 120 may programmatically fill in the forms to access additional (new) content.

From block 208 (FIG. 2A), processing continues to block 210 (FIG. 2B). In block 210, the hidden content locator 120 requests additional content from the candidate web sites to identify (obtain) second search results comprising previously hidden content (i.e., to find new (previously hidden) content). This may be performed by executing a new (second) search request against the candidate web sites. With embodiments, the hidden content locator 120 may look up pages that may exist (e.g., by requesting a URL that is "guessed" based on patterns), may perform a search by submitting a form, etc.

In block 212, the hidden content locator 120 indexes the additional content (for use for future search requests). In block 214, the hidden content locator 120, optionally, provides the second search results to the user who issued the search request (e.g., by displaying the second search results on a display device).

For example, with embodiments, for candidate web sites known to provide their own search box, a new search is conducted against the web site specific search form, if available, and results are indexed.

With embodiments, if a pattern match was found for a search term, the known Uniform Resource Links (URLs) for existing content from that web site are examined for the presence of the unknown search terms, and, if found, the hidden content locator 120 may substitute the new search term, fetch (GET) the corresponding web site, and index that web site. For instance, a page is known to the search engine at http://www-01.ibm.com/support/docview.wss?uid=swg27035893, and the user searches for "swg21688357". Although "swg21688357" is not (yet) known to the hidden content locator 120, "swg21688357" is similar in pattern to "swg27035893". The hidden content locator 120 makes a request to http://www-01.ibm.com/support/docview.wss?uid=swg21688357. The hidden content locator 120 finds a valid indexable page, one which is not (yet) indexed or in a publicly available sitemap.

With embodiments, pages which report content not being found, pages which do not contain unique content, pages with a report 404 code (a Hyper Text Transfer Protocol (HTTP) response status code indicating that a page at the given address is "not found") and other pages which indexing would normally ignore or determine to be low quality using existing means may be ignored. For instance, the response to http://www-01.ibm.com/support/docview.wss?uid=swg21688357 might have simply said "technote swg21688357 not found", with or without a 404 response code. The hidden content locator 120 may determine this page to be low value and not indicating new content, and so, this may not be indexed.

With embodiments, the hidden content locator 120 may supplement search results and find un-indexable content immediately following a failed search and provide the search results directly to the user. With embodiments, the hidden content locator 120 may either keep the search results back from the user and only return them once secondary sources outside the index have been consulted, or the hidden content locator 120 may supplement the search results (for instance, by using a websocket to send additional information to the browser) after the initial search results are displayed, so as to not delay the response time for the initial result display.

In certain embodiments, the operation of blocks 204-212 may be performed asynchronously with the initial user's search request (in which case block 202 returns initial search results) and may be performed merely to improve future search results with similar terms, eliminating the processing of block 214.

Merely to enhance understanding, an example is provided herein:
1. A user issues a search request for swg21687167 and no results are found.
2. The hidden content locator 120 determines that swg21687167 is found to be non-existent in the index (i.e., is an unknown search term).
3. a) The hidden content locator 120 determines that the search term is found to match a known pattern of words common on a company web site.
   b) The hidden content locator 120 determines that the user frequently clicks through on search results to this company web site.
   c) The hidden content locator 120 determines that the user is found to be connecting from a known company network (where the company is hosting the company web site of this example).
   d) The hidden content locator 120 is aware of documents on the company web site that cannot be found through sitemaps or internal links, so the company web site is likely to contain hidden content which is not already indexed.
   e) The hidden content locator 120, during normal indexing of the web site, has found a number of unique forms, which have as their input a single text field or which are otherwise believed to be search forms (through analysis of form, button, and text field identifiers and labels).
   ** All this leads to the conclusion that the company web site may have the information the user is seeking.
4. Search forms at the company web site are programmatically submitted with swg21687167 and the results crawled.
5. The index knows of links of the form http://www-01.ibm.com/support/docview.wss?uid=swg21687167 with user identifiers of similar patterns, so that URL is constructed, requested, and the results indexed.
6. The web page is found to be relevant by existing search engine techniques, not to be a 404, and does not appear to be a "not found" page.
7. A notification is sent to the user through their browser or search client informing them that new content has been found matching the search request.

Figure 3:
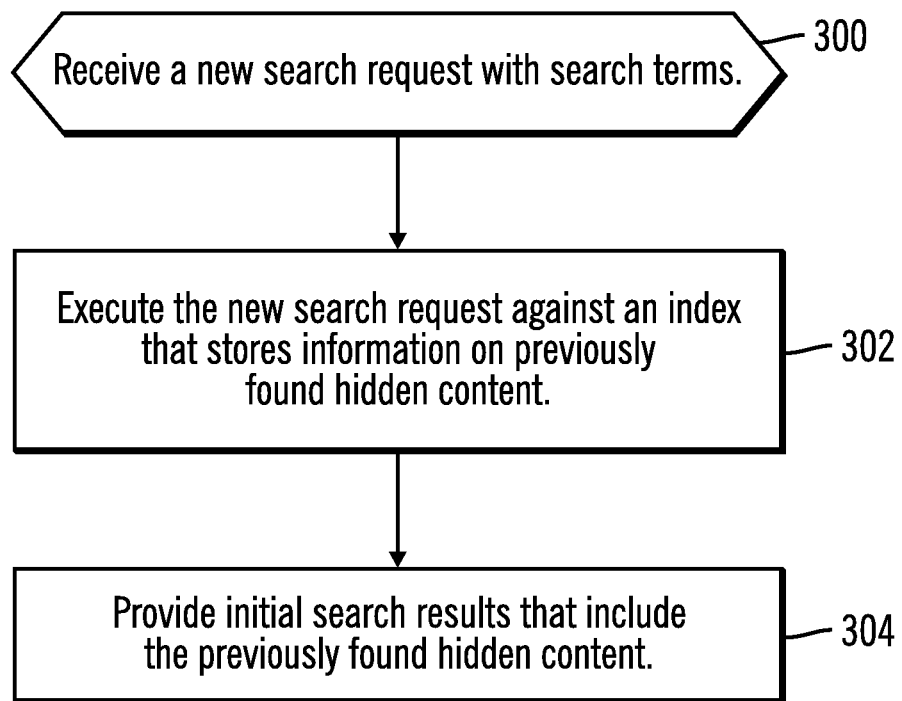
FIG. 3 illustrates, in a flow chart, operations for returning search results with previously found hidden content in accordance with certain embodiments.

FIG. 3 illustrates, in a flow chart, operations for returning search results with previously found hidden content in accordance with certain embodiments. Control begins at block 300 with the hidden content locator 120 receiving a new search request with search terms. In block 302, the hidden content locator 120 executes the new search request against an index that stores information on previously found hidden content.

In block 304, the hidden content locator 120 provides initial search results that include the previously found hidden content. After the initial search results are provided, the hidden content locator 120 may also perform the processing of blocks 204-214 of FIG. 2.

Embodiments provide a solution that does not rely on web sites providing complete sitemaps so that the search engine is able to crawl uncrawlable content and add this to its index. Embodiments provide this solution for internet searches, but also for enterprise searches, where a great deal of content is hidden behind application specific search interfaces and where the cost to develop individual sitemaps or sitemap generators may not be justifiable.

In some embodiments, finding this hidden content for indexing may be a matter of time. Given enough time, another web site may link to the uncrawlable content from a web page the search index does know about, but, in the meantime, users will not be able to use a search engine to find the hidden content. Since most content is discovered through search engines, some content may never be linked to or indexed, despite users searching for it. Thus, embodiments do not rely on such linking to find hidden content.

Additionally, embodiments may obtain more information from the user by looking at the user's IP address or by looking at the user's search history to see which sites the user visits the most often.

Embodiment provide for the formulation of possible URLs of candidate web sites. Embodiments also provide for background federated searches of web sites by filling in other web sites' search forms while having formulated a list of those web sites (rather than being selectable or hard-coded).

Figure 4:
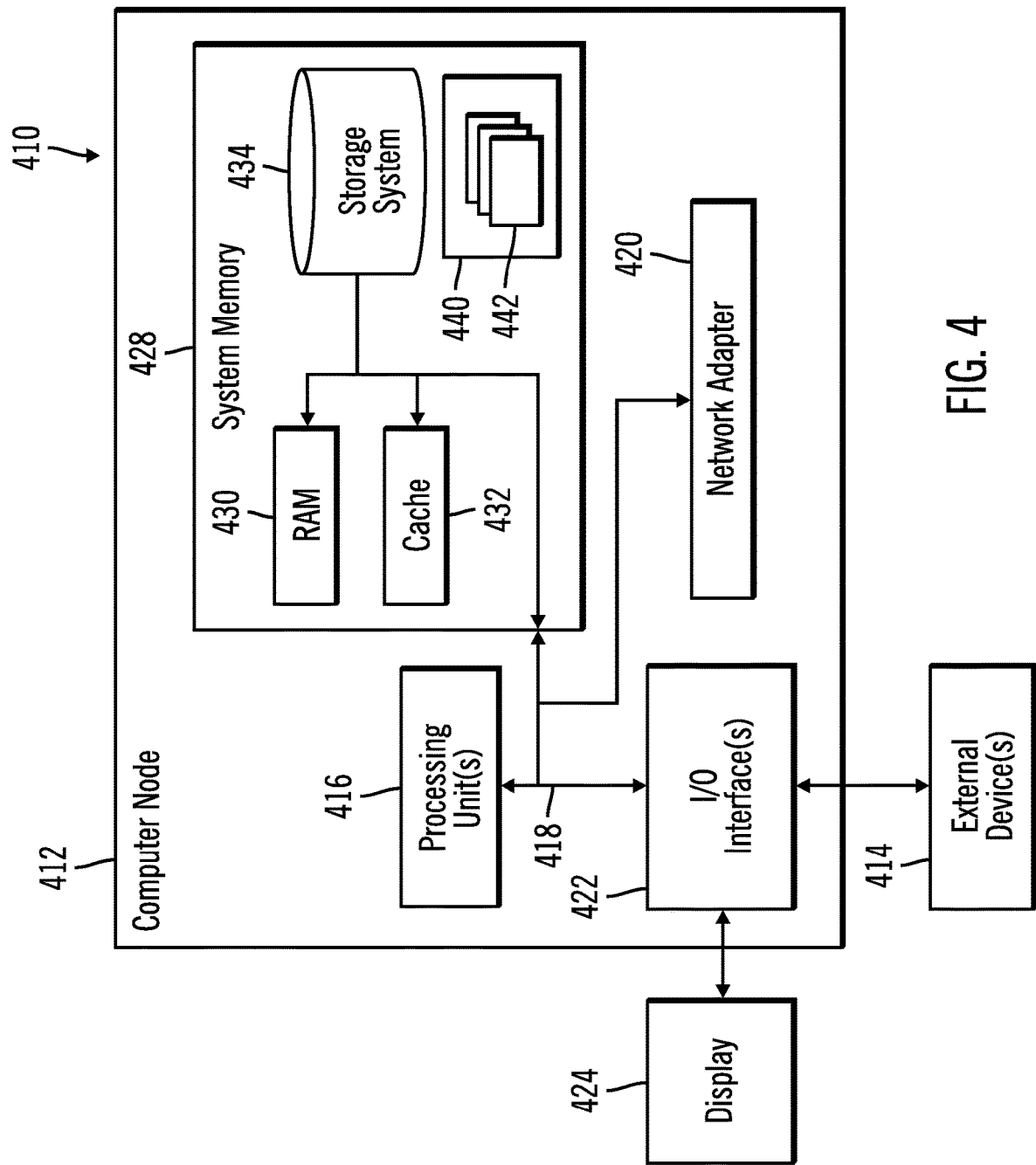
FIG. 4 illustrates a computing node in accordance with certain embodiments.

FIG. 4 illustrates a computing environment 410 in accordance with certain embodiments. In certain embodiments, the computing environment is a cloud computing environment. Referring to FIG. 4, computer node 412 is only one example of a suitable computing node and is not intended to suggest any limitation as to the scope of use or functionality of embodiments of the invention described herein. Regardless, computer node 412 is capable of being implemented and/or performing any of the functionality set forth hereinabove.

The computer node 412 may be a computer system, which is operational with numerous other general purpose or special purpose computing system environments or configurations. Examples of well-known computing systems, environments, and/or configurations that may be suitable for use with computer node 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 412 may be described in the general context of computer system executable instructions, such as program modules, being executed by a computer system. Generally, program modules may include routines, programs, objects, components, logic, data structures, and so on that perform particular tasks or implement particular abstract data types. Computer node 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer node 412 in cloud computing node 410 is shown in the form of a general-purpose computing device. The components of computer node 412 may include, but are not limited to, one or more processors or processing units 416, a system memory 428, and a bus 418 that couples various system components including system memory 428 to one or more processors or processing units 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 412 typically includes a variety of computer system readable media. Such media may be any available media that is accessible by computer node 412, and it includes both volatile and non-volatile media, removable and non-removable media.

System memory 428 can include computer system readable media in the form of volatile memory, such as random access memory (RAM) 430 and/or cache memory 432. Computer node 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, system memory 428 may include at least one program product having a set (e.g., at least one) of program modules that are configured to carry out the functions of embodiments of the invention.

Program/utility 440, having a set (at least one) of program modules 442, may be stored in system memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer node 412 may also communicate with one or more external devices 414 such as a keyboard, a pointing device, a display 424, etc.; one or more devices that enable a user to interact with computer node 412; and/or any devices (e.g., network card, modem, etc.) that enable computer node 412 to communicate with one or more other computing devices. Such communication can occur via Input/Output (I/O) interfaces 422. Still yet, computer node 412 can communicate with one or more networks such as a local area network (LAN), a general wide area network (WAN), and/or a public network (e.g., the Internet) via network adapter 420. As depicted, network adapter 420 communicates with the other components of computer node 412 via bus 418. It should be understood that although not shown, other hardware and/or software components could be used in conjunction with computer node 412. Examples, include, but are not limited to: microcode, device drivers, redundant processing units, external disk drive arrays, RAID systems, tape drives, and data archival storage systems, etc.

In certain embodiments, the computing device 100 has the architecture of computer node 412. In certain embodiments, the computing device 100 is part of a cloud environment. In certain alternative embodiments, the computing device 100 is not part of a cloud environment.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
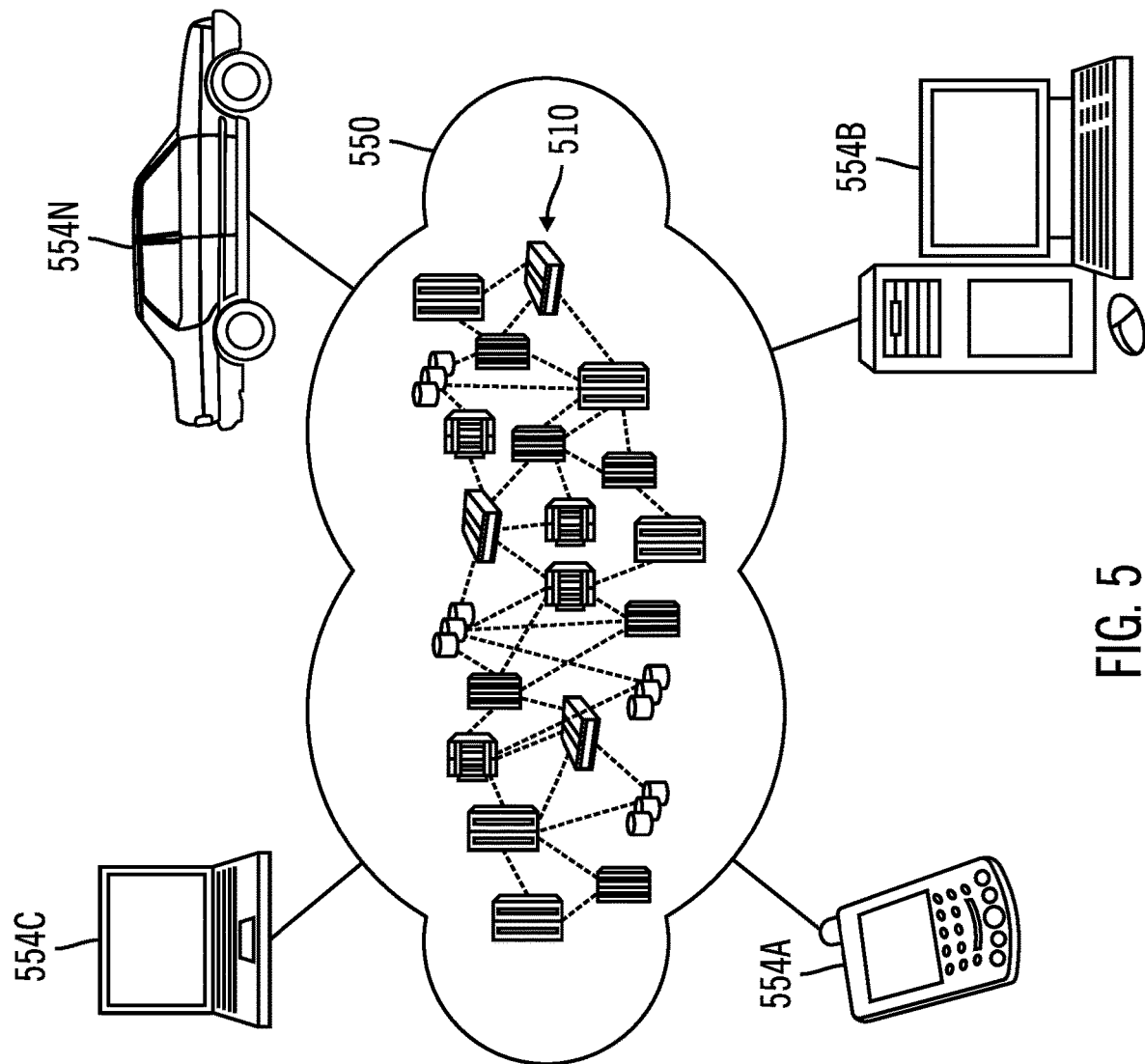
FIG. 5 illustrates a cloud computing environment in accordance with certain embodiments.

Referring now to FIG. 5, illustrative cloud computing environment 550 is depicted. As shown, cloud computing environment 550 comprises one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
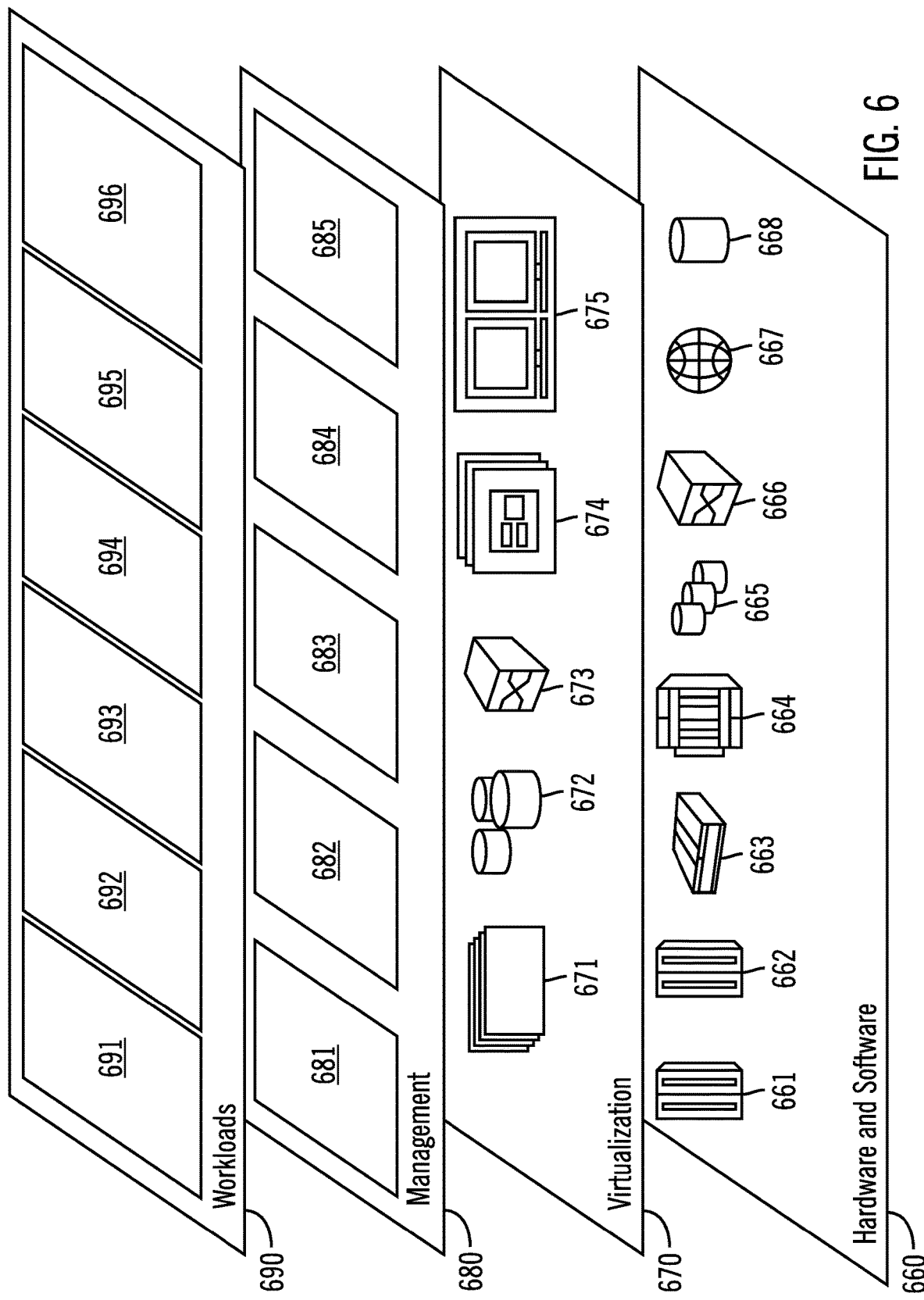
FIG. 6 illustrates abstraction model layers in accordance with certain embodiments.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and finding hidden content 696.

Thus, in certain embodiments, software or a program, implementing finding hidden content in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, the computer program product comprising a computer readable storage medium having program code embodied therewith, the program code executable by at least one processor to perform operations comprising:

storing an index that comprises previous search term to web site mappings and previous search term to pattern mappings, wherein patterns are associated with web sites;

deriving a pattern for a web site, wherein the pattern is derived from a locator of the web site, one or more prior search terms that resulted in navigation to the web site, and content of the web site, wherein the pattern is stored in the index, and wherein the pattern is associated with the web site;

associating a predictive score with the pattern and the web site to indicate how strongly the pattern is associated with the web site, wherein the predictive score comprises a count of times the one or more prior search terms matched the pattern divided by a value indicating a total number of web pages indexed;

receiving a search request having search terms;

executing the search request against the index to identify first search results;

determining that the search request failed based on detecting abandonment of the first search results in combination with one or more most relevant search results having a low relevancy score;

determining that a search term in the search terms does not exist in the index;

identifying the search term as an unknown search term;

matching the unknown search term to the pattern in the index;

identifying the web site that is associated with the pattern as a candidate web site based on the matching, wherein the candidate web site does not link to other web sites and is not linked to by other web sites;

requesting additional content from the candidate web site for the unknown search term to identify second search results comprising previously hidden content;

indexing the additional content; and in response to receiving a new search request, using the indexed additional content to respond.

2. The computer program product of claim 1, wherein another search request is determined to have failed based on at least one of finding no search results, finding that second search results have a low relevancy score, and detecting abandonment of the second search results.

3. The computer program product of claim 1, wherein the program code is executable by the at least one processor to perform further operations comprising:

identifying a plurality of candidate web sites by at least one of 1) detecting one or more web sites associated with a user issuing the search request, 2) detecting one or more web sites based on a specific network of the user, 3) detecting one or more web sites based on a geography of the user, and 4) detecting one or more web sites with separate search boxes.

4. The computer program product of claim 1, wherein a Software as a Service (SaaS) is configured to perform the operations of the computer program product.

5. The computer program product of claim 1, wherein the program code is executable by the at least one processor to perform:

ranking each candidate web site of a plurality of candidate web sites based on predictive scores.

6. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations comprising:

storing an index that comprises previous search term to web site mappings and previous search term to pattern mappings, wherein patterns are associated with web sites;

deriving a pattern for a web site, wherein the pattern is derived from a locator of the web site, one or more prior search terms that resulted in navigation to the web site, and content of the web site, wherein the pattern is stored in the index, and wherein the pattern is associated with the web site;

associating a predictive score with the pattern and the web site to indicate how strongly the pattern is associated with the web site, wherein the predictive score comprises a count of times the one or more prior search terms matched the pattern divided by a value indicating a total number of web pages indexed;

receiving a search request having search terms;

executing the search request against the index to identify first search results;

determining that the search request failed based on detecting abandonment of the first search results in combination with one or more most relevant search results having a low relevancy score;

determining that a search term in the search terms does not exist in the index;

identifying the search term as an unknown search term;

matching the unknown search term to the pattern in the index;

identifying the web site that is associated with the pattern as a candidate web site based on the matching, wherein the candidate web site does not link to other web sites and is not linked to by other web sites;

requesting additional content from the candidate web site for the unknown search term to identify second search results comprising previously hidden content;

indexing the additional content; and in response to receiving a new search request, using the indexed additional content to respond.

7. The computer system of claim 6, wherein another search request is determined to have failed based on at least one of finding no search results, finding that second results have a low relevancy score, and detecting abandonment of the second search results.

8. The computer system of claim 6, wherein the operations further comprise:

identifying a plurality of candidate web sites by at least one of 1) detecting one or more web sites associated with a user issuing the search request, 2) detecting one or more web sites based on a specific network of the user, 3) detecting one or more web sites based on a geography of the user, and 4) detecting one or more web sites with separate search boxes.

9. The computer system of claim 6, wherein a Software as a Service (SaaS) is configured to perform the operations of the computer system.

10. The computer system of claim 6, wherein the operations further comprise:

ranking each candidate web site of a plurality of candidate web sites based on predictive scores.

* * * * *